United States Patent
Norman

(10) Patent No.: US 10,296,376 B2
(45) Date of Patent: May 21, 2019

(54) PLANNING FOR MANUFACTURING ENVIRONMENTS

(71) Applicant: Applied Materials, Inc., Santa Clara, CA (US)

(72) Inventor: David Everton Norman, Bountiful, UT (US)

(73) Assignee: Applied Materials, Inc., Santa Clara, CA (US)

( * ) Notice: Subject to any disclaimer, the term of this patent is extended or adjusted under 35 U.S.C. 154(b) by 245 days.

(21) Appl. No.: 15/265,453

(22) Filed: Sep. 14, 2016

(65) Prior Publication Data

US 2017/0075333 A1  Mar. 16, 2017

Related U.S. Application Data

(60) Provisional application No. 62/219,125, filed on Sep. 16, 2015.

(51) Int. Cl.
  *G06F 19/00* (2018.01)
  *G06F 9/48* (2006.01)
  *G06Q 10/06* (2012.01)

(52) U.S. Cl.
  CPC ....... *G06F 9/4881* (2013.01); *G06Q 10/0631* (2013.01); *G06Q 10/0633* (2013.01); *G06Q 10/06316* (2013.01)

(58) Field of Classification Search
  CPC ............ G05B 19/0426; G05B 23/0272; G05B 2219/23289; G06F 9/4881
  See application file for complete search history.

(56) References Cited

U.S. PATENT DOCUMENTS

| | | | | |
|---|---|---|---|---|
| 2004/0158339 A1* | 8/2004 | Kawase | ............ | G06Q 10/0631 700/97 |
| 2006/0259198 A1* | 11/2006 | Brcka | ................ | G05B 19/4184 700/246 |
| 2013/0060370 A1* | 3/2013 | Sidner | .................... | G06Q 10/06 700/99 |
| 2015/0074025 A1* | 3/2015 | Chien | .................... | G06N 3/126 706/13 |
| 2016/0062347 A1* | 3/2016 | Aqlan | .................. | G05B 19/418 700/99 |

OTHER PUBLICATIONS

Barahona et al. "Robust Capacity Planning in Semiconductor Manufacturing". Published online May 5, 2005 in Wiley InterScience. (Year: 2005).*

(Continued)

*Primary Examiner* — Adam Lee
(74) *Attorney, Agent, or Firm* — Patterson + Sheridan, LLP

(57) ABSTRACT

Embodiments presented herein provide techniques for executing a block-based workflow to perform a planning process for a semiconductor manufacturing environment. The block-based workflow includes a plurality of blocks that specify a set of operations for performing the planning process. One embodiment includes extracting planning data from a spreadsheet application, converting the data from a first schema to a second schema, generating a plan for the semiconductor manufacturing environment, and publishing the plan to the spreadsheet application, based on the plurality of blocks in the block-based workflow.

20 Claims, 7 Drawing Sheets

(56) References Cited

OTHER PUBLICATIONS

Geng et al. "Stochastic programming based capacity planning for semiconductor wafer fab with uncertain demand and capacity". European Journal of Operational Research 198 (2009) 899-908. (Year: 2009).*
Geng et al. "A review on strategic capacity planning for the semiconductor manufacturing industry". International Journal of Production Research, vol. 47, No. 13, Jul. 1, 2009, 3639-3655. (Year: 2009).*
Hood et al. "Capacity Planning Under Demand Uncertainty for Semiconductor Manufacturing". IEEE Transactions on Semiconductor Manufacturing, vol. 16, No. 2, May 2003. (Year: 2003).*
Hung et al. "A Production Planning Methodology for Semiconductor Manufacturing Based on Iterative Simulation and Linear Programming Calculations". IEEE Transactions on Semiconductor Manufacturing, vol. 9, No. 2, May 1996. (Year: 1996).*
Swaminathan, Jayashankar M. "Tool capacity planning for semiconductor fabrication facilities under demand uncertainty". European Journal of Operational Research 120 (2000) 545-558. (Year: 2000).*

\* cited by examiner

PLANNING FOR MANUFACTURING ENVIRONMENTS

CROSS-REFERENCE TO RELATED APPLICATION

This application claims benefit of United States Provisional Patent Application Ser. No. 62/219,125, filed on Sep. 16, 2015, and titled "PLANNING FOR MANUFACTURING ENVIRONMENTS," which is incorporated by reference herein in its entirety.

BACKGROUND

Field

Embodiments of the present disclosure generally relate to planning, and more particularly to techniques for performing planning processes to generate plans for a manufacturing environment, using block-based workflows.

Description of the Related Art

Manufacturing facilities across many different industries are responsible for producing products that are used in every facet of life. In the case of semiconductor manufacturing, for example, semiconductor manufacturing facilities manufacture products such as microprocessors, memory chips, microcontrollers, and other semiconductor devices that have a ubiquitous presence in everyday life. These semiconductor devices are used in a wide variety of applications, examples of which include automobiles, computers, home appliances, cellular phones, and many others. Further, in recent years, both the number of applications and demand for devices (including semiconductor devices) has steadily increased. This increased demand has led manufacturing facilities to become increasingly conscious of increasing product variety and reducing delivery times.

Each manufacturing environment is unique and extremely complex, often requiring immense amounts of capital for the necessary equipment, tools, facilities, etc. In semiconductor manufacturing environments, for example, the semiconductor manufacturing production process is generally divided into two parts, "front-end" and "back-end," both of which use different types of semiconductor manufacturing equipment. Front-end typically refers to wafer fabrication. For example, front-end manufacturing facilities generally start with blank semiconductor wafers (e.g., silicon wafers) and perform various processes, such as photolithography, deposition, etching, cleaning, ion implantation, chemical and mechanical polishing, etc., to fabricate a completed wafer with many semiconductor die on the wafer. Back-end typically refers to the assembly and testing of individual semiconductors. For example, once the front-end production process is completed, the completed wafers are transferred to a back-end manufacturing facility, which typically performs functions such as dicing the completed wafer into individual semiconductor die, testing, assembly, packaging, etc.

In today's world of just-in-time manufacturing and shipping, it is becoming increasingly important for manufacturing facilities to be able to accurately predict when they will be able to ship a product so that proper commitments can be made to customers. For this reason, many manufacturing facilities typically perform production planning to attempt to predict if and when they will be able to meet customer demand, plan future equipment need based on demand, and the like. Most manufacturing facilities typically use spreadsheet applications (e.g., such as Microsoft® Excel®, and the like) for planning. However, planning with these applications alone is insufficient for large and complex manufacturing facilities, as these applications are cumbersome and can only handle relatively simple calculations.

Further, even in manufacturing facilities that build and implement custom-built planning systems, these custom built planning systems are difficult to maintain and inflexible, which makes it difficult to make modifications to the planning system. In many cases, for example, the manufacturing facility may undergo changes, such as modifications to existing equipment, incorporating new equipment, equipment failures, changes to the facility due to regulatory requirements, etc. Adapting custom-built planning systems to account for such changes can require a level of technical expertise that may not be available to the manufacturing facility (e.g., an end user may not have coding experience, etc.), require a significant time commitment, substantial costs (e.g., due to the complexity of the facilities), etc.

Further yet, in some cases, manufacturing facilities can purchase and implement commercial planning systems to perform planning. Commercial planning systems, however, are generally closed, black box solutions that do not allow customization or control by an end user. In these cases, modifying the planning system is simply not possible without paying the commercial vendor (e.g., to modify the planning system, design a new planning system, etc.), which can be very cost-prohibitive and time-consuming. In addition, traditional planning systems (e.g., spreadsheet applications, custom-built systems, commercial systems, etc.) generally are not capable of evaluating a determined plan and/or troubleshooting in the case of a problem. As a result, identifying potential problems in a particular plan and/or modifying the plan can require immense amounts of time, other expensive solutions, etc., all of which can impact the manufacturing facility's ability to predict whether it can meet the increasing demand for products.

SUMMARY

Embodiments disclosed herein include methods, systems, and computer program products for planning a semiconductor manufacturing environment, using block-based workflows. In one embodiment, a method for executing a block-based (BB) workflow to perform a planning process that generates a plan for the semiconductor manufacturing environment is disclosed. The method includes receiving at least one BB workflow that includes a plurality of blocks. The plurality of blocks specify a set of operations for performing the planning process for the semiconductor manufacturing environment. The method also includes accessing a plurality of block definitions corresponding to the plurality of blocks, and executing the at least one BB workflow by performing the set of operations based on the plurality of block definitions. Executing the at least one BB workflow includes retrieving planning data that describes an operating state of the semiconductor manufacturing environment and a set of demands for semiconductor devices to be produced from the semiconductor manufacturing environment, converting the planning data from a first schema used by the semiconductor manufacturing environment to a second schema, generating, based on the converted data, a plan for the semiconductor manufacturing environment, and publishing the plan to at least one of the spreadsheet application or a storage system in the semiconductor manufacturing environment. The generated plan can determine whether the semiconductor manufacturing environment has capacity to satisfy the set of demands, determine at least one change that should be made to the semiconductor manufacturing environment in order to satisfy the set of demands, or run one or more experiments to determine operations within the semiconductor manufacturing environment.

Another embodiment provides a non-transitory computer-readable medium containing computer program code that, when executed, performs an operation for executing a BB workflow to perform a planning process that generates a plan for the semiconductor manufacturing environment. The operation includes receiving at least one BB workflow that includes a plurality of blocks. The plurality of blocks specify a set of operations for performing the planning process for the semiconductor manufacturing environment. The operation also includes accessing a plurality of block definitions corresponding to the plurality of blocks, and executing the at least one BB workflow by performing the set of operations based on the plurality of block definitions. Executing the at least one BB workflow includes retrieving planning data that describes an operating state of the semiconductor manufacturing environment and a set of demands for semiconductor devices to be produced from the semiconductor manufacturing environment, converting the planning data from a first schema used by the semiconductor manufacturing environment to a second schema, generating, based on the converted data, a plan for the semiconductor manufacturing environment, and publishing the plan to at least one of the spreadsheet application or a storage system in the semiconductor manufacturing environment. The generated plan can determine whether the semiconductor manufacturing environment has capacity to satisfy the set of demands, determine at least one change that should be made to the semiconductor manufacturing environment in order to satisfy the set of demands, or run one or more experiments to determine operations within the semiconductor manufacturing environment.

Still another embodiment provides a planning system for a semiconductor manufacturing environment. The planning system includes at least one processor and a memory. The memory stores a computer program that, when executed by the at least one processor, performs an operation for executing a BB workflow to perform a planning process that generates a plan for the semiconductor manufacturing environment. The operation includes receiving at least one BB workflow that includes a plurality of blocks. The plurality of blocks specify a set of operations for performing the planning process for the semiconductor manufacturing environment. The operation also includes accessing a plurality of block definitions corresponding to the plurality of blocks, and executing the at least one BB workflow by performing the set of operations based on the plurality of block definitions. Executing the at least one BB workflow includes retrieving planning data that describes an operating state of the semiconductor manufacturing environment and a set of demands for semiconductor devices to be produced from the semiconductor manufacturing environment, converting the planning data from a first schema used by the semiconductor manufacturing environment to a second schema, generating, based on the converted data, a plan for the semiconductor manufacturing environment, and publishing the plan to at least one of the spreadsheet application or a storage system in the semiconductor manufacturing environment. The generated plan can determine whether the semiconductor manufacturing environment has capacity to satisfy the set of demands, determine at least one change that should be made to the semiconductor manufacturing environment in order to satisfy the set of demands, or run one or more experiments to determine operations within the semiconductor manufacturing environment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
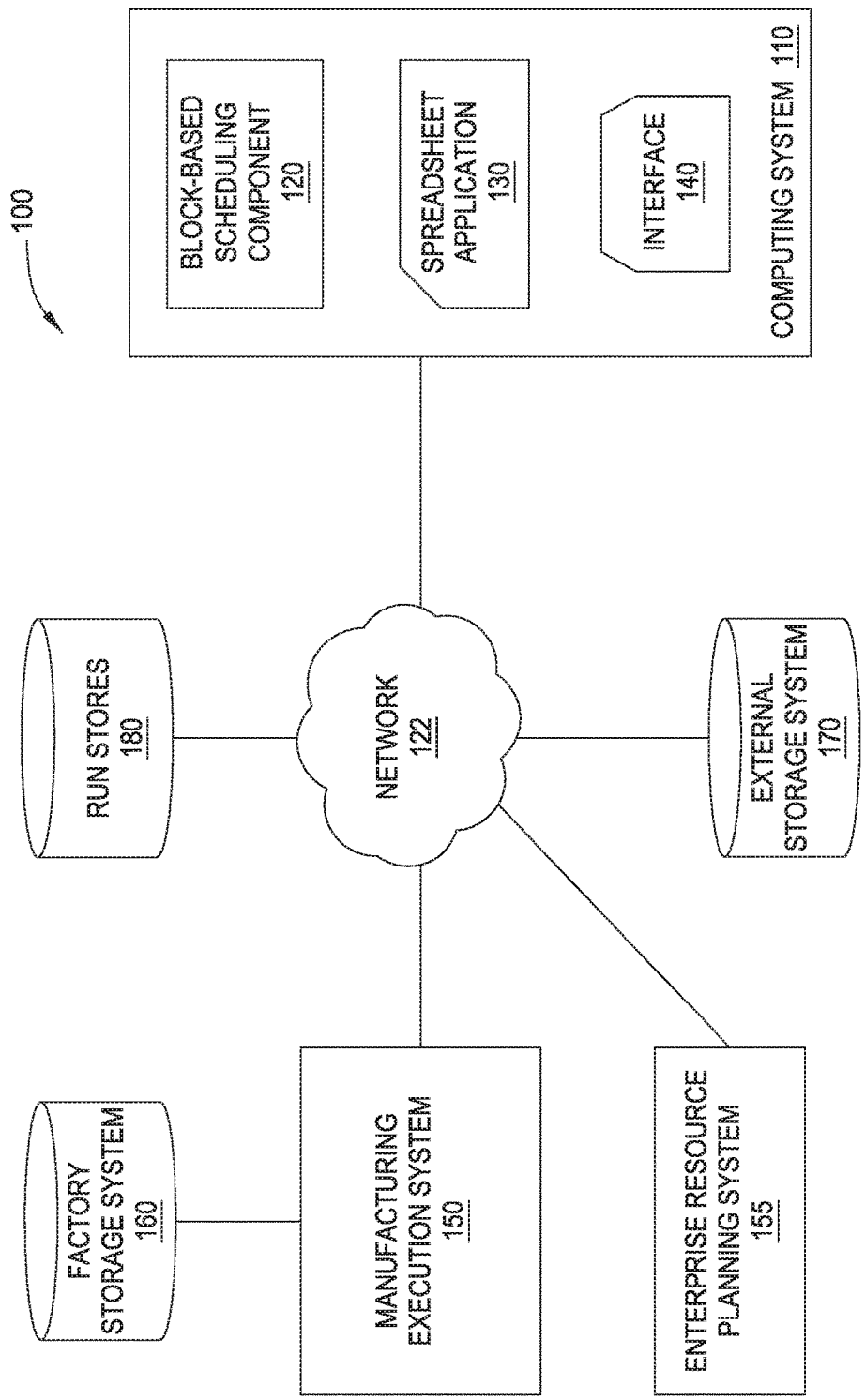
FIG. 1 illustrates a block diagram of an architecture of a manufacturing environment configured with a block-based planning component, in accordance with embodiments of the present disclosure.

To facilitate understanding, identical reference numerals have been used, wherever possible, to designate identical elements that are common to the Figures. Additionally, it is contemplated that elements disclosed in one embodiment may be beneficially used in other embodiments described herein without specific recitation.

DETAILED DESCRIPTION

Embodiments presented herein present techniques for generating production plans for determining information related to operations within a manufacturing environment, using block-based workflows. The workflows can be used by an end-user to coordinate one or more steps in a planning process to construct a production plan for the manufacturing environment. For example, the production plan can be used to determine capacity of the manufacturing environment to produce one or more products, determine which products have to be produced in what amounts and/or by which tools (or equipment) in the manufacturing environment in order to meet demand, predict ship dates for products, determine what future capacity (e.g., additional tools, resources, etc.) is needed to satisfy demand, run one or more planning experiments to determine operations, resources, what future demands can be supported, etc. within the manufacturing environment, and other information related to operations within the manufacturing environment. In the case of semiconductor manufacturing, for example, such products can include various semiconductor devices, such as microprocessors, memory chips, microcontrollers, etc. As described below, each workflow contains an order of a series of operations (represented by one or more logical abstractions (or blocks)) that are performed in order to generate the production plan. By arranging and/or modifying blocks within the workflow, an end-user can adapt the planning process to account for any change to the manufacturing environment, customer demand, availability of raw materials, etc., without having specialized programming knowledge or writing complicated scripting and code.

Production planning for manufacturing facilities (or factories) is a very complex and time-consuming process. For example, production flows within manufacturing facilities are often uncertain, loading within the manufacturing facilities can change frequently (e.g., due to equipment failures, processing speeds of different tools, etc.), different products can require different amounts of resources, etc. Recently, manufacturing facilities are increasingly finding it difficult to use and/or adapt production plans for their facilities with traditional planning techniques. For example, most planners use spreadsheet applications, custom-built planning systems, or purchase commercial planning systems to implement planning. In the case of spreadsheet applications, using spreadsheet applications alone to plan is often very cumbersome, inefficient and subject to human error, in part due to the complexity of manufacturing facilities. Similarly, modifying custom-built planning systems requires complicated scripting and code to be written by a user with specialized programming knowledge, which can be expensive to undergo in environments (such as manufacturing environments) that are constantly changing. Further, commercial planning systems are closed, black-box systems that do not allow customization or control by an end-user. As such, modifying commercial planning systems is not possible without paying additional money to the commercial vendor (e.g., to modify the planning system, build a new planning system, etc.).

As will be described in more detail below, embodiments provide techniques that can be used to create an open, fully configurable and extensible system for planning manufacturing environments, through the use of block-based workflows. For example, an end-user can use the techniques presented herein to extend the workflow (e.g., to include additional steps, etc.), adjust the processing order of a workflow, configure (or customize) the one or more operations within each block of the workflow, etc., all without understanding or writing any code. Further, as described below, the techniques presented herein allow manufacturing facilities to evaluate a generated plan and troubleshoot the plan in the event of errors. As such, the planning system presented herein provides users the ability to quickly adapt their planning to changing circumstances, perform troubleshooting, etc., without undergoing difficult and time-consuming operations associated with legacy planning systems.

One embodiment includes a method for executing, by a block-based (BB) planning component, at least one BB workflow to produce a plan for a manufacturing environment (e.g., such as a semiconductor front-end or back-end facility or factory). For example, as part of the plan, the BB planning component can determine, given a current and/or estimated future state of the manufacturing environment, a capability of the manufacturing environment to meet a demand for one or more products, determine what changes (e.g., additional raw materials, new tools, changes to product flows, etc.) should be made to the manufacturing environment in order to meet a demand for one or more products, determine future ship dates for the products, run experiments to determine operations of the manufacturing environment, and/or other information related to future capability of the manufacturing environment. In some embodiments, the generated plan can be a firm plan that a manufacturing environment employs to manage operations within the facility. In other embodiments, the generated plan can be a possible plan that the manufacturing environment compares to other possible plans for the manufacturing environment.

Upon receiving a request to generate a plan (e.g., initiated by a user), the BB planning component extracts (or retrieves) planning data. For instance, the BB planning component could extract the data directly from a device(s) within the manufacturing environment or from a data store (e.g., a spreadsheet application, a database, etc.) storing the data collected from the manufacturing environment. Generally, the planning data includes information that describes an operating state of the manufacturing environment (e.g., present and estimated future factory capacity information, number of tools, processing speeds of the tools, additional tools needed to produce a given product, etc.) and information describing a set of demands for one or more products to be produced from the manufacturing environment (e.g., sale orders for the products, projected sales for the products, requested ship dates, etc.). The BB planning component may convert the data from a first schema (or format) used by the manufacturing environment to a second schema. The BB planning component may evaluate the data in one of the first schema or second schema for errors, and report any errors to a user. The BB planning component may process the converted data to generate a plan for the manufacturing environment. The generated plan can determine at least one of when the manufacturing environment will be able to ship the one or more products, predict whether the manufacturing environment will be able to meet the set of demands for the one or more products, determine at least one change that should be made to the manufacturing environment to satisfy the set of demands, or can be used to run one or more experiments to determine operations of the manufacturing environment. The BB planning component can publish the plan to at least one of the spreadsheet application or a storage system in the manufacturing environment.

In one embodiment, the BB planning component performs each of the above operations based on various blocks within one or more BB workflows. Each block of the BB workflow specifies one or more operations of the set of operations that the BB planning component performs when the BB planning component executes the workflow. As described below, the BB planning component can access a plurality of block definitions corresponding to the plurality of blocks in the workflow, and execute the workflow by performing the set of operations based on the plurality of block definitions. In this manner, using the techniques presented herein, a user can edit and/or customize the sequence of operations (that are executed by the BB planning component) by changing the order of the blocks in the BB workflow, adding/removing blocks in the BB workflow, etc.

Further, the techniques presented herein allow a user to configure some or all of the operations within one or more blocks of the BB workflow with one or more BB rules and reports. For example, upon executing one or more blocks in the BB workflow, the BB planning component may further evaluate at least one BB sub-rule or report configured for the respective workflow block in order to determine the operations specified by the workflow block. Doing so in this manner provides users the ability to edit, and customize (e.g., without understanding or writing code) a planning process to account for any changes in and/or outside the manufacturing facility.

Note that, for the sake of convenience, many of the following embodiments are described with reference to semiconductor manufacturing facilities (e.g., front-end and back-end facilities) as reference examples of types of manufacturing environments that may undergo planning using the techniques presented herein. Note, however, that the techniques presented herein can also be applied to other types of manufacturing environments (e.g., in other industries).

FIG. 1 is a block diagram illustrating an architecture of a manufacturing environment (or system) 100, in which aspects of the present disclosure may be practiced. For example, in one embodiment, the manufacturing environment 100 is an example of a semiconductor front-end or back-end manufacturing facility. As shown, the manufacturing environment 100 includes a computing system 110, manufacturing execution system (MES) 150, enterprise resource planning (ERP) system 155, factory storage system 160, external storage system 170 and run stores 180 connected via a network 122. In general, the network 122 can be a wide area network (WAN), local area network (LAN), wireless LAN (WLAN), etc. The factory storage system 160, external storage system 170 and run stores 180, in general, can be any kind of storage system, including, for example, relational and/or hierarchal databases, distributed filing systems, etc. In one embodiment, the computing system 110, MES 150 and ERP system 155 can be any kind of physical computing system having a network interface, such as a desktop computer, laptop computer, mobile device, tablet computer, server computing systems, gateway computers, and the like.

The MES 150 and ERP system 155 are generally configured to manage and control the operation of a current work-in-progress (WIP) within the manufacturing environment 100. For a front-end semiconductor manufacturing factory, the MES 150 can control one or more processes related to the fabrication of semiconductor wafers. For a back-end semiconductor manufacturing factory, the MES 150 can control one or more processes related to cutting, assembly, and testing of semiconductor die on the wafers. The MES 150 can monitor the operation of one or more tools (or equipment) operating in the manufacturing environment 100, receive data directly from the tools, receive data from the ERP system 155, analyze data from the tools and ERP system 155, and/or collect the data. In one embodiment, the MES 150 can store the data (received from the tools) into factory storage system 140. Such information stored in the factory storage system 140 can include information regarding the current WIP, number of tools in the manufacturing environment, operating parameters (e.g., processing speeds, capacity load, and the like) of the tools, manufacturing data, and other metadata characteristic of the manufacturing environment 100.

The ERP system 155 is configured to collect, store, manage and interpret data related to resources within the manufacturing environment (e.g., amount of capital, raw materials, production capacity, etc.), current and future commitments within the manufacturing environment (e.g., orders, projected sales, delivery dates, etc.), information related to supply chain management (e.g., such as information that describes movement and storage of raw materials, WIP inventory, amount of finished goods, finances, and other information related to the flow of goods and services from supplier to ultimately the consumer), and the like. In one embodiment, some or all of this information can be stored into the factory storage system 160, ERP system 155, spreadsheet application 130, etc.

As shown, the computing system 110 includes BB planning component 120, spreadsheet application 130, and interface 140. The spreadsheet application 130 can be used to organize, analyze, and store planning data in a tabular format (e.g., for use by a user). The spreadsheet application 130 can store any portion (or all) of the data described above. In one embodiment, the spreadsheet application 130 is Microsoft® Excel®; however, in general, any spreadsheet application can be used with the techniques presented herein. The BB planning component 120 generally represents logic (e.g., a software application, device firmware, an ASIC, etc.) that is configured to implement one or more of the techniques presented herein. For example, the BB planning component 120 could perform method 500 illustrated in FIG. 5, method 600 illustrated in FIG. 6, and/or any of the techniques (or combination of techniques) described herein.

In one embodiment, a user can use the BB planning component 120 to generate plans for the manufacturing environment 100. For example, in the case of semiconductor manufacturing, a user can generate plans for determining if capacity of the manufacturing system can satisfy demand, what changes (if any) the manufacturing system should implement to meet demand, project future output of the manufacturing system, determine which products the manufacturing system produces, where the products will be produced, the amount of products to produce, run experiments to determine what operations the manufacturing system should perform, etc. The user can trigger the BB planning component 120 to generate a plan on demand. Each plan can determine the future operating state of the manufacturing system over any length of period of time (e.g., every two weeks, month, year, etc.).

In one embodiment, once the BB planning component 120 receives a request (e.g., from a user) to generate a plan for the manufacturing environment 100, the BB planning component 120 can upload (retrieve or extract) planning data from at least one of the factory storage system 160 or the spreadsheet application 130. As mentioned above, the planning data can include information regarding equipment availability, processing speeds, future demands (e.g., such as customer orders, projected sales, etc.), raw materials, maintenance schedules, etc. In one embodiment, the BB planning component 120 can upload the planning data directly from the spreadsheet application 130. In another embodiment, the BB planning component 120 can upload the planning data from the spreadsheet application via the interface 140. Examples of the interface 140 include web graphical user interface (GUIs), thick-clients, and the like.

In one embodiment, once the BB planning component 120 generates a plan, the BB planning component 120 publishes the results of the plan to the spreadsheet application 130 to allow the user to view, modify, and/or use the plan. Alternatively or additionally, once the BB planning component 120 generates the plan, the BB planning component 120 publishes the plan to the external storage system 170. Publishing the generated plans to the external storage system 170 allows the BB planning component 120 to make the plans available to different entities (e.g., such as customers and the like) that request the plan. Doing so in this manner allows user(s) to compare a generated plan with one or more other plans before implementing any particular plan for the manufacturing environment.

In one embodiment, the BB planning component 120 is configured to execute at least one BB workflow in order to generate a plan for the manufacturing environment 100. The BB planning component 120 can receive a workflow (e.g., created by an end-user) that includes a plurality of blocks where each block in the workflow specifies one or more operations that are performed when the BB planning component 120 executes the respective block. This workflow can be more easily edited and/or customized (e.g., by a user) without any specialized programming knowledge, relative to conventional scripting solutions. For example, the user can re-arrange the blocks in the workflow (e.g., to adjust the steps that the BB planning component 120 performs during the planning process), add blocks to the workflow (e.g., to add steps that the BB planning component 120 performs during the planning process), and/or remove blocks from the workflow (e.g., to remove steps that the BB planning component 120 performs during the planning process). As described below, the user can also configure the specific operations for one or more blocks in the workflow with a BB sub-rule and/or report.

In one embodiment, once the user stores a particular workflow for a planning process, the BB planning component 120 retrieves the workflow, reads and parses the workflow to determine one or more types of blocks with the workflow. The BB planning component 120 can access, for each block, definition file(s) corresponding to a type of block, and determine at least one function to call in order to perform the operations specified within the block. The BB planning component 120 can execute the BB workflow based on the definition files. In another embodiment, once the user creates a particular workflow for a planning process, the BB planning component 120 converts the operations specified by each of the blocks into one or more low-level script files, and executes the script files in order to carry out the particular planning process. Doing so in this manner provides a fully configurable planning system that allows users to adapt the planning systems, as needed, without undergoing the expensive, time-consuming efforts associated with adapting legacy planning systems.

In one embodiment, the BB planning component 120 is configured to write, for each planning run, some or all the input and/or output data associated with the blocks of the workflow to the run stores 180. This data captures the state of the manufacturing system for one or more steps of a planning run, such that, in the event there is a problem with a generated plan, the manufacturing system can reproduce the problem since all data needed to reproduce what occurred is available in run stores 180. In this manner, the manufacturing system can troubleshoot any problems by retrospectively debugging the system. Note, however, that FIG. 1 illustrates merely one possible arrangement of the manufacturing environment 100. More generally, one of ordinary skill in the art will recognize that other embodiments of manufacturing systems can also be configured to implement planning in accordance with the techniques presented herein.

Figure 2:
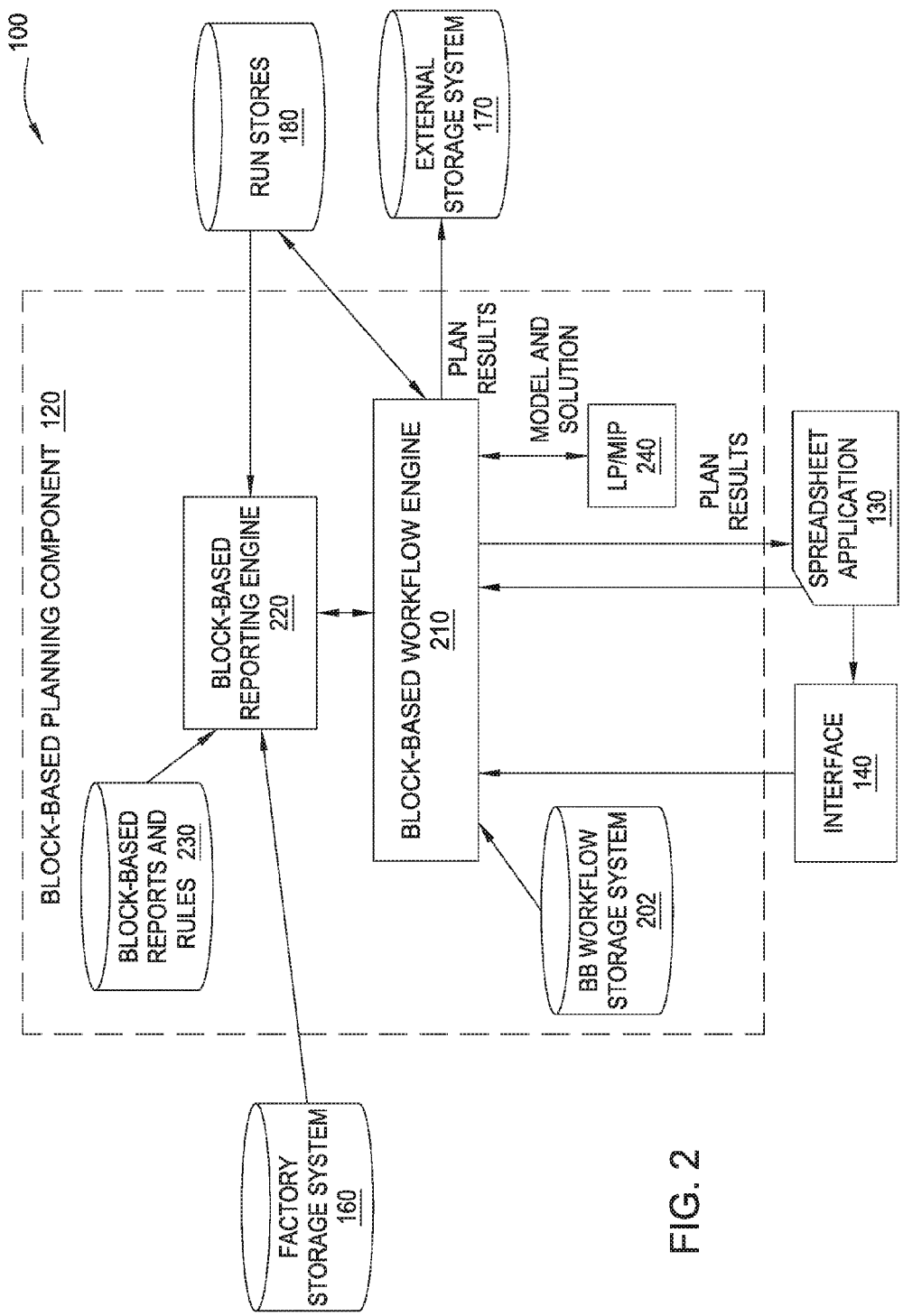
FIG. 2 illustrates a block diagram of an architecture of a block-based planning component within a manufacturing environment, in accordance with embodiments of the present disclosure.

FIG. 2 further illustrates an example of the BB planning component 120 described relative to FIG. 1, according to one embodiment. The BB planning component 120 is configured to perform a planning process to generate a plan for the manufacturing environment 100, using block-based workflows. As mentioned above, the plan can determine if the manufacturing facility has capacity to meet demand, determine the changes the manufacturing facility should implement to meet demand, predict ship orders for one or more products, run experiments to determine what future demands can be supported, and the like.

As shown, the BB planning component 120 includes a BB workflow engine 210, a BB reporting engine 220, a BB reports and rules (RR) storage system 230, and linear programming (LP)/mixed integer programming (MIP) solver 240. In one embodiment, the BB workflow engine 210 interacts with and manages BB reporting engine 220 and LP/MIP solver 240 in order to carry out a planning process that generates a plan for the manufacturing environment 100. The BB workflows storage system 202 includes one or more BB workflows, each of which can be used (e.g., by the BB planning component 120) to perform a planning process. The BB workflows can be created, edited, and/or customized by a user and stored in the BB workflow storage system 202.

In one embodiment, the BB workflow engine 210 receives at least BB workflow 202 (e.g., from a user) or retrieves at least one BB workflow (e.g., from BB workflow storage system 202, etc.) and executes each of the blocks in an order specified within the BB workflow(s). As mentioned above, each block of the BB workflow(s) specifies one or more operations that are performed (e.g., by one of the BB reporting engine 220, LP/MIP solver 240, etc.) when the BB workflow engine 210 executes the respective block. Examples of operations that can be included within the BB workflow(s) include, but are not limited to, uploading planning data from one or more sources (e.g., spreadsheet application 130, factory storage system 160, ERP system 155, etc.), transforming and manipulating the data, generating a plan based on the data, publishing the plan to multiple outputs (e.g., spreadsheet application 130, external storage system 170, etc.), saving information before and/or after one or more steps during the planning process, performing error checking on the generated plan, reporting the errors to a user, etc. In this manner, the BB workflow engine 210 can control the sequence of operations that the BB planning component 210 performs to generate a plan for the manufacturing environment 100.

According to various embodiments, depending on the blocks specified in the BB workflow(s), the BB planning component 120 can use one of the BB workflow engine 210, BB reporting engine 220 and/or LP/MIP solver 240 to execute the respective block. For example, in one embodiment, the BB planning component 120 can upload, via the BB reporting engine 220, data about the manufacturing environment 100 from the factory storage system 160. Such data can include, for example, descriptions of equipment in the manufacturing environment 100, operating parameters of different pieces of equipment, current state of equipment, current WIP, data from ERP system 155, etc. In one embodiment, upon extracting the information from the factory storage system 160, the BB planning component 120 can use the BB reporting engine 220 to perform one or more transformations or manipulations on the extracted data. For example, the data extracted from factory storage system 160 may be in a format (or schema) that is specific or proprietary to the manufacturing environment 100 and not compatible with the BB planning component 120. In these situations, the BB reporting engine 220 can convert the data from the proprietary format to a common schema that is compatible with the rest of the BB planning component 120. In addition, the BB reporting engine 220 can evaluate the proprietary schema data and/or common schema data for errors, and if errors are detected, correct the errors in one of the proprietary schema data or the common schema data, and report the errors to a user (e.g., via e-mail, storing in a database, etc.). In some embodiments, the BB reporting engine 220 can use at least one BB sub-rule and/or report within the BB RR storage system 250 to perform the data extraction, data conversion, error checking, etc. For example, the BB reports and/or rules allow the user to configure the operations for one or more blocks in the BB workflow(s), without the need to understand or write any code. In this manner, the techniques presented herein allow the user to customize the operations for the blocks in the planning process that may be used to extract the data, convert the data, perform error checking, etc.

Alternatively, or additionally, in another embodiment, the BB workflow engine 210 can receive planning data directly from the spreadsheet application 130. The data received from the spreadsheet application 130 can include some or all of the same or different information from the factory storage system 160. For example, the spreadsheet application 130 could include information related to work orders, projected sales, supplier information, customer information, raw materials, estimated ship dates, etc. Once the BB workflow engine 210 receives information from the spreadsheet application 130, the BB workflow engine 210 can use the BB reporting engine 220 to convert the data to a common schema, perform error checking, etc.

Alternatively, or additionally, in another embodiment, the BB workflow engine 210 can use the interface 140 to extract planning data from the spreadsheet application 130. In one implementation, for example, the interface 140 can be a web browser (or other similar interface) that allows the user to upload data from the spreadsheet application 130 to the BB workflow engine 210. In another implementation, the interface 140 can be a thick client UI that allows the user to upload data from the spreadsheet application 130 to the BB workflow engine 210. In general, however, the user can use any interface to extract data from the spreadsheet application 130. Once the BB workflow engine 210 receives information from the spreadsheet application 130 via the interface 140, the BB workflow engine 210 can use the BB reporting engine 220 to convert the data to a common schema, perform error checking, etc.

In one embodiment, once the BB workflow engine 210 converts the planning data into a common schema and performs error checking on the common schema data, the BB planning component 120 may evaluate the data and generate, based on the converted data, a plan for the manufacturing environment 100. In some embodiments, the BB workflow engine 210 can use the LP/MIP solver 240 to create and run at least one LP/MIP mathematical programming model to generate the plan. For example, the BB workflow engine 210 can create multiple LP/MIP models with different constraints and/or objective functions to consider multiple business requirements (e.g., different demands for different products, different raw materials, etc.). A user can configure the LP/MIP solver 240 with one or more BB rules and/or reports in order to setup the constraints, objective functions, and/or parameters that the user may want the LP/MIP solver 240 to consider when it generates and runs each LP/MIP model. For example, one or more BB reports can be used to setup each LP/MIP model, determine constraints for the LP/MIP models, convert data into formats compatible with the LP/MIP solver 240 (e.g., if any propriety mathematical solvers are used, etc.), and the like. In addition, one or more BB rules (created by a user) can be used to configure the objective function for each LP/MIP model, determine which constraints will govern each LP/MIP models, process the results of the LP/MIP solver 240 that runs the LP/MIP models (e.g., which can include converting the results back to the common schema, etc.). In general, the LP/MIP solver 140 can use any LP and/or MIP solver (e.g., open source, proprietary, etc.) to generate a plan for the manufacturing environment.

In one embodiment, once the BB workflow engine 210 generates (via the LP/MIP component 240) a plan, the BB workflow engine 210 publishes the plan, analysis of the plan, etc. to at least one of the external storage system 170 or spreadsheet application 130. For example, the BB workflow engine 210 can use one or more metrics (or key performance indicators (KPIs)) to evaluate how the plan will affect the efficiency of the manufacturing environment, financial performance of the manufacturing environment, etc. This information, along with the actual plan, can be provided back to the user via the external storage system 170 and/or the spreadsheet application 130. In one embodiment, the BB workflow engine 120 is configured to publish the information directly back to the spreadsheet application 130 and external storage system 170. In one embodiment, the BB workflow engine 210 is configured to use interface 140 to publish the information back to one of the spreadsheet application 130 and external storage system 170. In one embodiment, the BB workflow engine 210 can use at least one BB report and/or rule (e.g., within BB RR 230) to process the information (e.g., converting the information back to the schema used by the manufacturing environment 100 and/or spreadsheet application 130, etc.) before publishing the information to at least one of the external storage system 170 or spreadsheet application 130.

As mentioned above, the techniques presented herein allow the BB planning component 120 to evaluate the generated plans and perform troubleshooting in the event of any problems or errors. For example, in one embodiment, upon receiving the input and output data associated with the execution of each block in the BB workflow 202, the BB workflow engine 210 writes some or all of the input and/or output data for one or more blocks to the run stores 180. For each planning run, the BB workflow engine 210 can write any one of the extracted data, common schema data, LP/MIP model(s) and results, published plans, and other information associated with one or more blocks in the BB workflow 202 to the run stores 180. In one embodiment, the BB workflow engine 210 writes to a file system directory (within the run stores 180) that is unique to each planning run, which allows the BB workflow engine 210 to reproduce the state of the manufacturing environment 100 for one or more steps of the planning process. The BB planning component 120, for example, can evaluate the data associated with one or more steps via the BB reporting engine 220 (and via one or more BB reports and rules) to determine any changes that need to be made to the planning process. As such, the techniques presented herein allow for retrospective debugging, since all the data associated with one or more steps of a planning run can be made available via the run stores 180.

Note, however, that FIG. 2 illustrates merely one possible configuration of the BB planning component 120. More generally, one of ordinary skill in the art will recognize that other embodiments of the BB planning component 120 can also be configured to implement planning in accordance with the techniques presented herein. For example, although the BB workflow engine 210, BB reporting engine 220, interface 140, spreadsheet application 130 and the LP/MIP solver 240 are shown as separate entities, in other embodiments, these components could be included as part of one computing system. Further, although the BB reporting engine 220 and LP/MIP solver 240 are shown within the BB planning component 220, in some embodiments, the BB reporting engine 220 and LP/MIP solver 240 can be external to the BB planning component 220.

Figure 3:
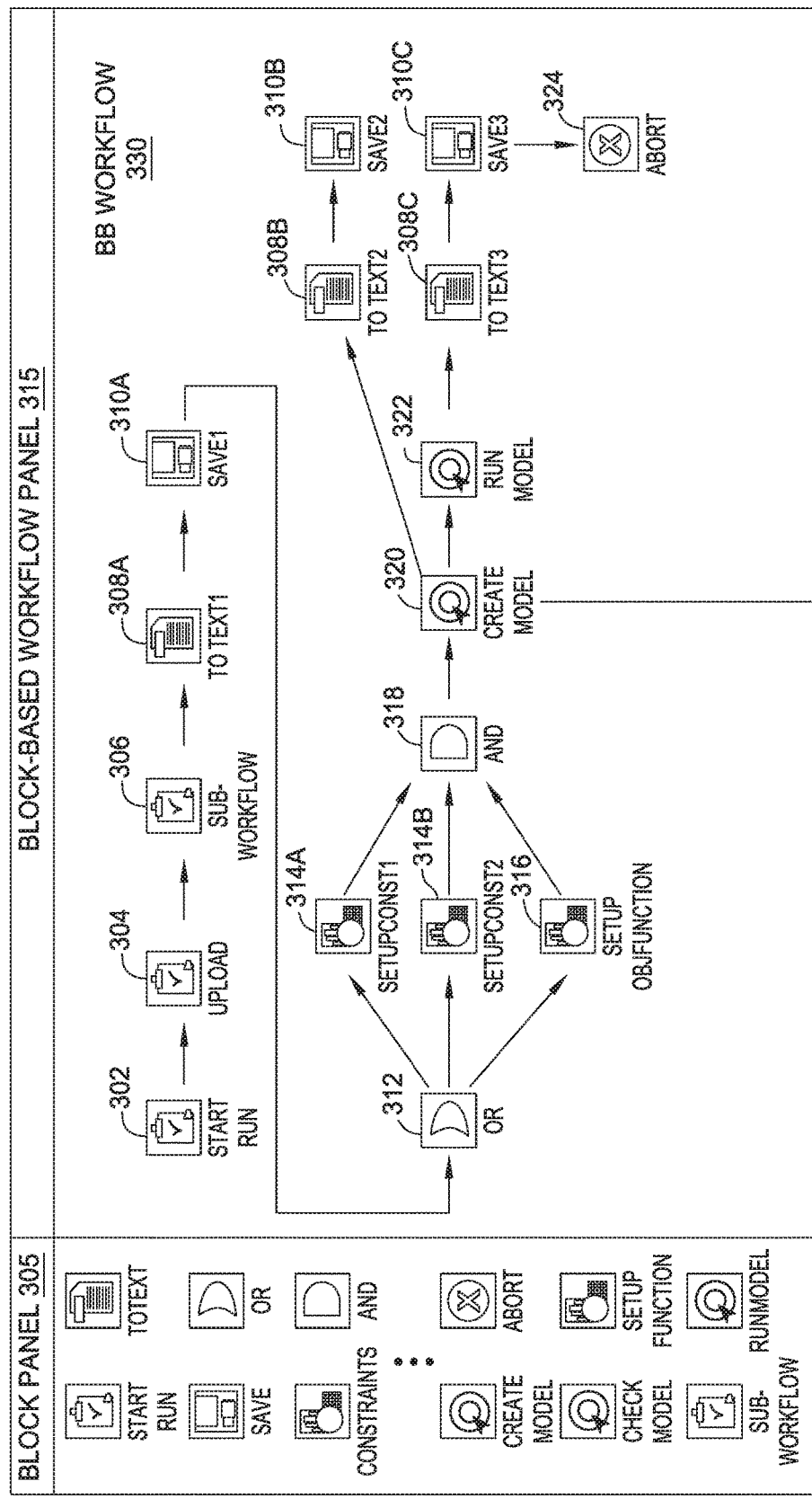
FIG. 3 illustrates an interface with a block-based workflow for generating a plan for a manufacturing environment, in accordance with embodiments of the present disclosure.

FIG. 3 illustrates a user interface 300 with a BB workflow 330 that can be used to perform a planning process to generate a plan for a manufacturing environment, according to one embodiment. As shown, the user interface 300 includes a block panel 305 and a BB workflow panel 315. The block panel 305 includes a plurality of blocks that allow a user to customize operations within a BB workflow to generate a plan for a manufacturing environment. In this embodiment, each block is depicted as a small image characteristic of the block's function. However, note that, in general, the blocks can be depicted in other manners (e.g., size, shape, color, etc.). BB workflow panel 315 illustrates one example of a BB workflow 330. Note that, for the sake of convenience, only a portion of the BB workflow 330 is illustrated. More generally, those of ordinary skill in the art will recognize that a user can create and/or modify any BB workflow to include any number of blocks.

In one embodiment, the user interface (UI) 300 is a graphical user interface (GUI) that allows the user to drag and drop blocks from block panel 305 into BB workflow panel 315. The user can arrange the blocks (in BB workflow panel 315) in any order or configuration, which allows the user to quickly adapt the planning system to any changes within the manufacturing environment, without understanding or writing any code. For example, each block in the block panel 305 is a logical abstraction that represents an operation or a series of operations that can be performed to generate a plan. In one embodiment, the UI 300 allows the user to specify one or more properties for each block in the workflow panel 315. The one or more properties can specify a data source for the block, timing of one or more operations associated with the block, and/or other criteria associated with performing the operations associated with performing the operations associated with the block. In one embodiment, the operations and/or the properties for each block in the BB workflow panel 315 can be stored in one or more definition files that the BB planning component 120 can access in order to execute each block.

In one embodiment, once the BB planning component 120 executes the BB workflow, the BB planning component 120 reads the definition files, converts the operations listed in the files into a low-level script that the BB planning component 120 executes to generate a plan. In another embodiment, once the BB planning component 120 retrieves at least one BB workflow from the BB workflow storage system 202, the BB planning component 120 reads and parses the BB workflow to determine the types of blocks within the BB workflow. The BB planning component 120 can access one or more block definitions corresponding to each type of block within the BB workflow. The BB planning component 120 can execute the BB workflow based on the block definitions and/or the properties of the blocks in the BB workflow. For example, in one case, the BB planning component 120 can determine at least one function to call in order to perform the operations in the block, based on the definitions and properties of the block. The BB planning component 120 can then perform the set of operations for each block in the BB workflow using the determined functions in order to execute the BB workflow.

In this particular embodiment, this portion of the BB workflow 330 includes blocks 302-324, which together specify a sequence of operations which, when executed by the BB planning component 120, can result in generation of a plan. Specifically, block 302 defines a start operation that triggers the initial execution of the BB workflow 330. Block 304 defines an operation for uploading/extracting/retrieving data from one or more sources (e.g., a storage system, user, spreadsheet application, etc.). Block 306 defines a processing operation that can call a BB sub-workflow (not shown).

For example, the BB sub-workflow can be used to perform operations such as convert the data to a common schema, perform error checking, etc. Further, each of these operations in the BB sub-workflow can further be configured with one or more BB sub-rules and/or reports.

Blocks 308A-308C represent operations for converting data to a text file. Blocks 310A-310C represent operations for saving data (e.g., to a run store or other storage system) at different points in the BB workflow sequence. Blocks 312-322 represent operations that may be performed to setup, create, and run a model, such as a LP/MIP model, to determine a plan for the manufacturing environment 100. For example, to setup the LP/MIP model, blocks 314A-314B can determine (e.g., based on a BB rule and/or report) constraints, block 316 can setup an objective function(s) for the model, block 320 can create the model based on the inputs, and block 322 can run the model. Lastly, block 324 represents an abort operation that may be performed in the event the workflow is unable to determine an allocation. Note that the BB workflow 330 depicted in FIG. 3 and described above represents merely one example of a sequence of blocks that can be configured, e.g., by a user without coding. In general, the techniques presented herein can be used to modify and/or customize a planning system to any manufacturing environment.

Figure 4:
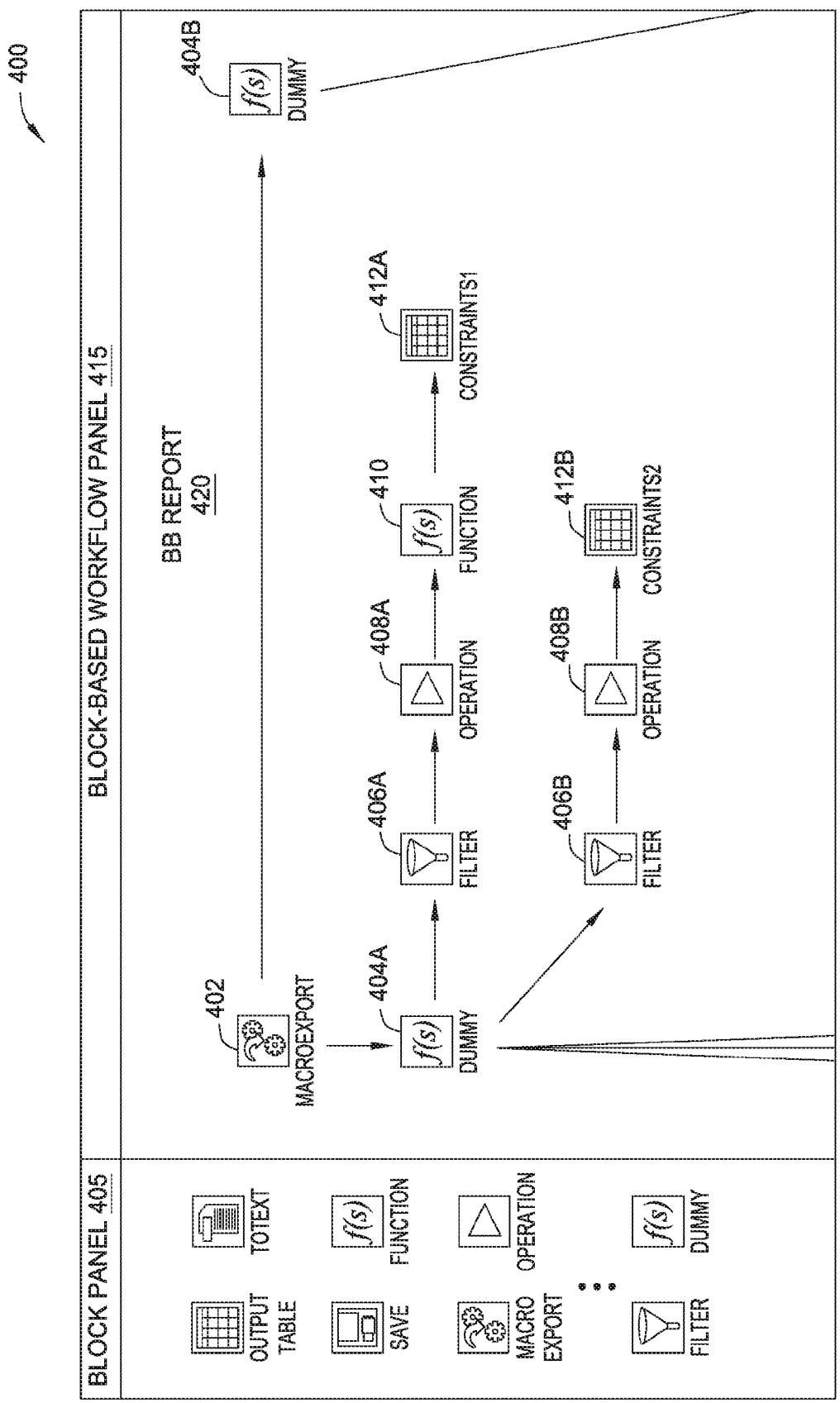
FIG. 4 illustrates an interface with a block-based report for configuring the set of operations for a block of a block-based workflow, in accordance with embodiments of the present disclosure.

FIG. 4 illustrates a user interface 400 with a BB report that can be used to configure a set of operations to be performed for a particular block in a BB workflow, according to one embodiment. As shown, the user interface 400 includes a block panel 405 and a BB reports and rules panel 415. The block panel 405 includes a plurality of blocks that allow a user to configure operations for a BB report (and/or rule) that can be used by a block within a BB workflow. In this particular embodiment, the BB reports and rules panel 415 includes a BB report 420. Note that, for the sake of convenience, BB panel 415 illustrates only a portion of the BB report 420. More generally, those of ordinary skill in the art will recognize that a user can create and/or modify the BB report 420 to include any number of blocks.

Similar to the UI 300 in FIG. 3, in one embodiment, the user interface 400 is a GUI that allows the user to drag and drop blocks from block panel 405 into BB RR panel 415. The user can arrange the blocks (in BB RR panel 415) in any order or configuration. Each block in the block panel 405 is also a logical abstraction that represents one or more operations for configuring the blocks in the block panel 305. In this particular embodiment, BB report 420 can be used to configure a set of operations performed for blocks 312B-312C of FIG. 3. For example, blocks 402-412 of the BB report 420 specify a certain set of operations for determining constraints that can be used to setup at least one LP/MIP model. Specifically, block 402 represents a macro operation that pulls information from another report (e.g., located in a database, generated from another BB report, etc.).

Blocks 404A and 404B represent operations for manipulating pulled in from the block 402. For example, blocks 406A-412A specify data manipulation operations for generating a first set of constraints; blocks 406B-412B specify data manipulation operations for generating a second set of constraints; and so on. Examples of the different operations that can be configured with the blocks 406-412, include filtering operations (e.g., with blocks 406A-B, removing data entries that do not satisfy a particular condition), compressing operations (e.g., with blocks 408A-B, reducing the information based on one or more criteria), transformations (e.g., with block 410), and so on. Once the data manipulation operations are completed, blocks 412A-412B can be used to generate tables with the results, which in this embodiment represent the different constraints for the LP/MIP model.

In one embodiment, the one or more operations for each block within the BB report 420 can be stored in definition file(s) that the BB planning component 120 can access in order to convert the operations into a low-level script for configuring the blocks in the BB workflow panel 315. In another embodiment, the BB planning component 120 can access definition file(s) corresponding to different types of blocks, and determine at least one function to call in order to execute the blocks (e.g., to configure the blocks in the BB workflow panel 315), based on the definition files and one or more properties for each block. Note that the BB report 420 depicted in FIG. 4 and described above represents merely one example of a sequence of blocks that can be configured, e.g., by a user without coding.

Figure 5:
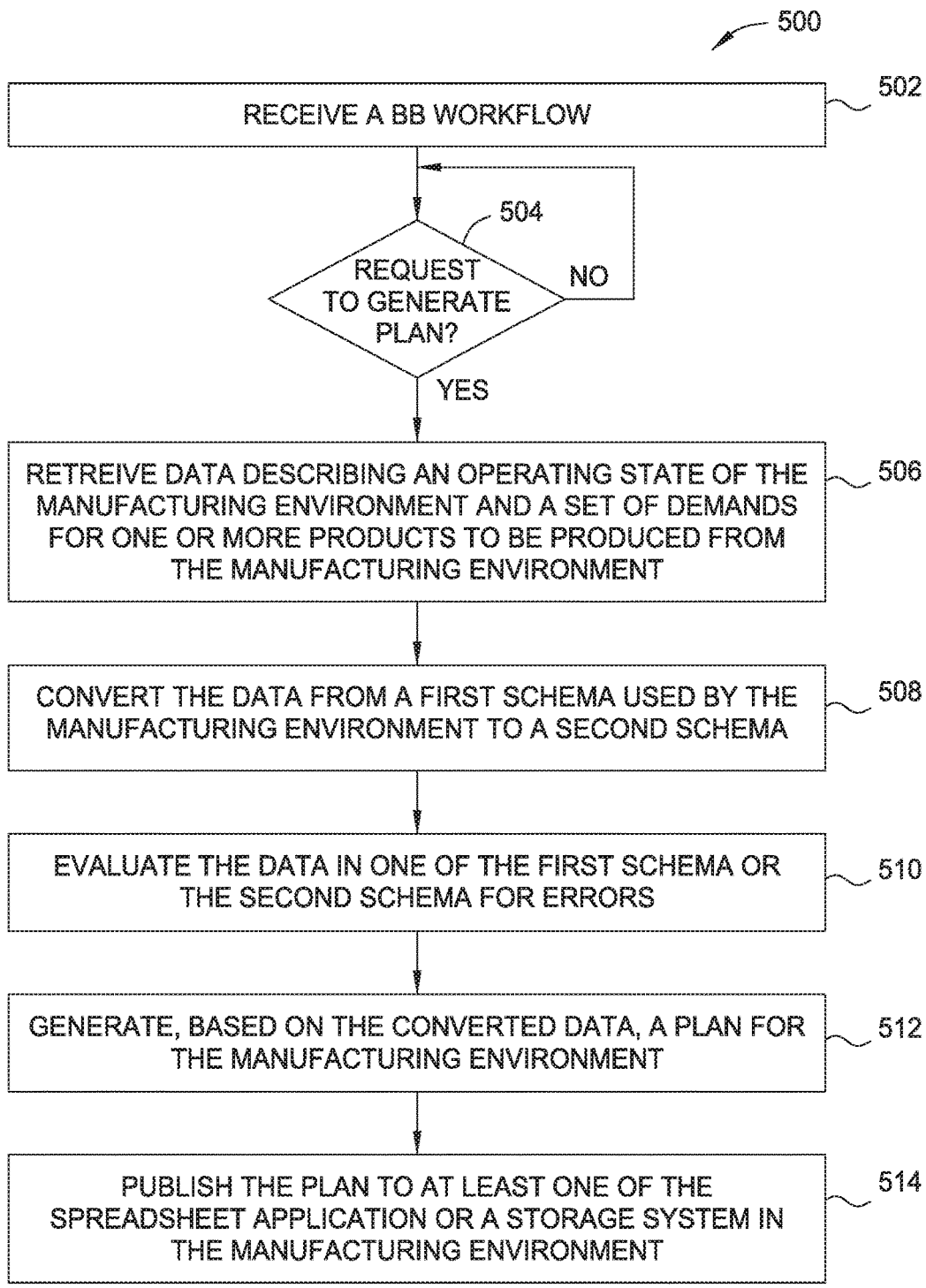
FIG. 5 is a flow diagram illustrating a method for performing a planning process for a manufacturing environment, using a block-based workflow, in accordance with embodiments of the present disclosure.

FIG. 5 is a flow diagram of a method 500 for executing a BB workflow to perform a planning process for a manufacturing environment, according to one embodiment. As shown, the method begins at block 502, where the BB planning component 120 receives a BB workflow (e.g., from a user). The BB workflow includes a plurality of blocks that specify a set of operations for performing a planning process. To perform the set of operations, at block 504, the BB planning component 120 determines whether it has received a request (e.g., from a user) to generate a plan for the manufacturing environment 100. If so, the BB planning component 120 uploads planning data from at least one of a spreadsheet application 130 or the manufacturing environment 100 (block 506). In one embodiment, the planning data includes information characteristic of the manufacturing environment 100 (e.g., such as information regarding the current WIP, availability of one or more devices operating in the manufacturing environment, operating parameters of the one or more devices, etc.), metadata related to movement and storage of raw materials, WIP inventory, amount of finished goods, orders for products, projected sales, etc.

In one embodiment, the BB planning component 120 uploads planning data directly from the spreadsheet application 130. In another embodiment, the BB planning component 120 uploads planning data from the spreadsheet application 130 via the interface 140. In one embodiment, the BB planning component 120 uses the BB reporting engine 220 to extract planning data from the manufacturing environment. In yet another embodiment, the BB planning component 120 can upload portions of the planning data from any source using any one or combination of the above techniques.

At block 508, the BB planning component 120 converts the data from a first schema used by the manufacturing environment to a second schema. For example, as mentioned above, the second schema can be a common schema that is compatible with the planning system. At block 510, the BB planning component 120 evaluates the data in one of the first schema or the second schema for errors. In one embodiment, the BB planning component 120 can report any identified errors to a user. At block 512, the BB planning component 120 processes the converted data to generate a plan for the manufacturing environment. In one embodiment, the BB planning component 120 can employ at least one LP/MIP solver (configured with at least one BB report or rule) to generate the plan. The plan can determine (or forecast) capacity of the manufacturing environment to produce one or more products, determine which products have to be produced in what amounts and/or by which one or more devices in the manufacturing environment in order to meet demand, predict ship dates for products, determine what changes the manufacturing environment should make in order to satisfy demand, run one or more planning experiments to determine operations within the manufacturing environment, etc. At block 514, the BB planning component 120 publishes the plan to at least one of the spreadsheet application or an external storage system.

Figure 6:
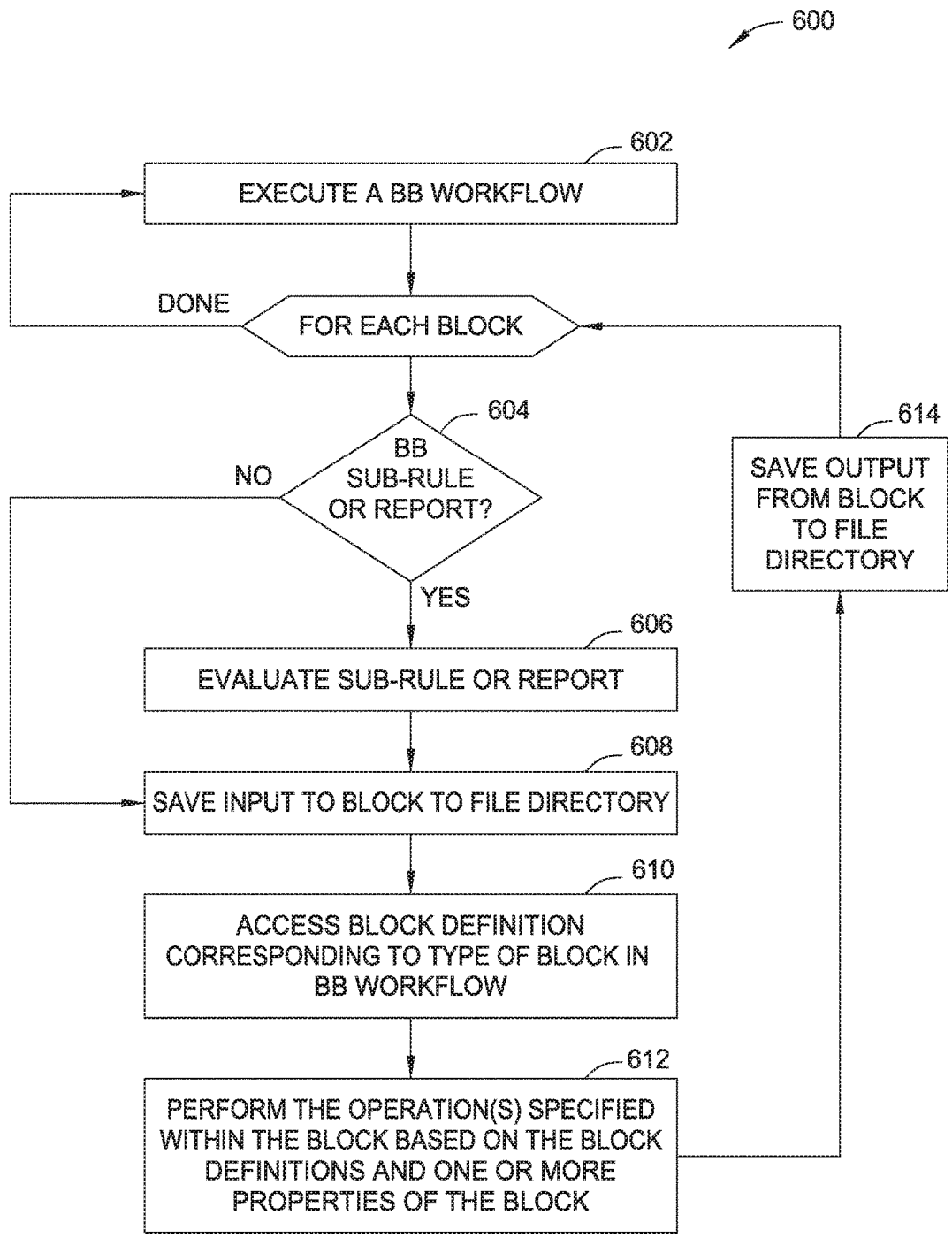
FIG. 6 is a flow diagram illustrating another method for performing a planning process for a manufacturing environment, using a block-based workflow, in accordance with embodiments of the present disclosure.

FIG. 6 is a flow diagram of a method 600 for executing a block-based workflow to perform a planning process for a manufacturing environment, according to one embodiment. As shown the method begins at block 602, where the BB planning component 120 executes a BB workflow. For each block, the BB planning component 120, at block 604, determines if the block is configured with a BB sub-rule or report (block 604). If so, the BB planning component 120 evaluates, at block 606, the BB sub-rule or report to determine at least one operation to perform when executing the workflow block. After evaluating the BB sub-rule or report (or if the BB planning component 120 determines the workflow block is not configured with a BB sub-rule or report), the BB planning component 120 saves, at block 608, the input to the workflow block to a file directory (e.g., such as in run stores 150). In one embodiment, the BB planning component 120 can save some or all of the input from the workflow block to the file directory. In one embodiment, the BB planning component 120 can determine to save none of the input from the workflow block to the file directory (e.g., in situations where the BB planning component 120 can reproduce the state of the manufacturing environment without such data, etc.). At block 610, the BB planning component 120 accesses a block definition corresponding to a type of the block in the BB workflow. At block 612, the BB planning component 120 performs the operation(s) specified within the block based on the block definitions and one or more properties of the block. For example, as mentioned above, the BB planning component 120 can determine at least one function to call in order to execute the workflow block, based on the block definition and/or one or more properties of the block. At block 614, the BB planning component 120 saves the output from the workflow block to the file directory. In one embodiment, the BB planning component 120 can save some or all of the output from the workflow block to the file directory. In one embodiment, the BB planning component 120 can determine to save none of the output from the workflow block to the file directory (e.g., in situations where the BB planning component 120 can reproduce the state of the manufacturing environment without such data, etc.). Doing so in this manner, allows the BB planning component 120 to reproduce the state of the manufacturing environment at each step of the planning process, which can be used to troubleshoot the planning process in the event of errors.

Figure 7:
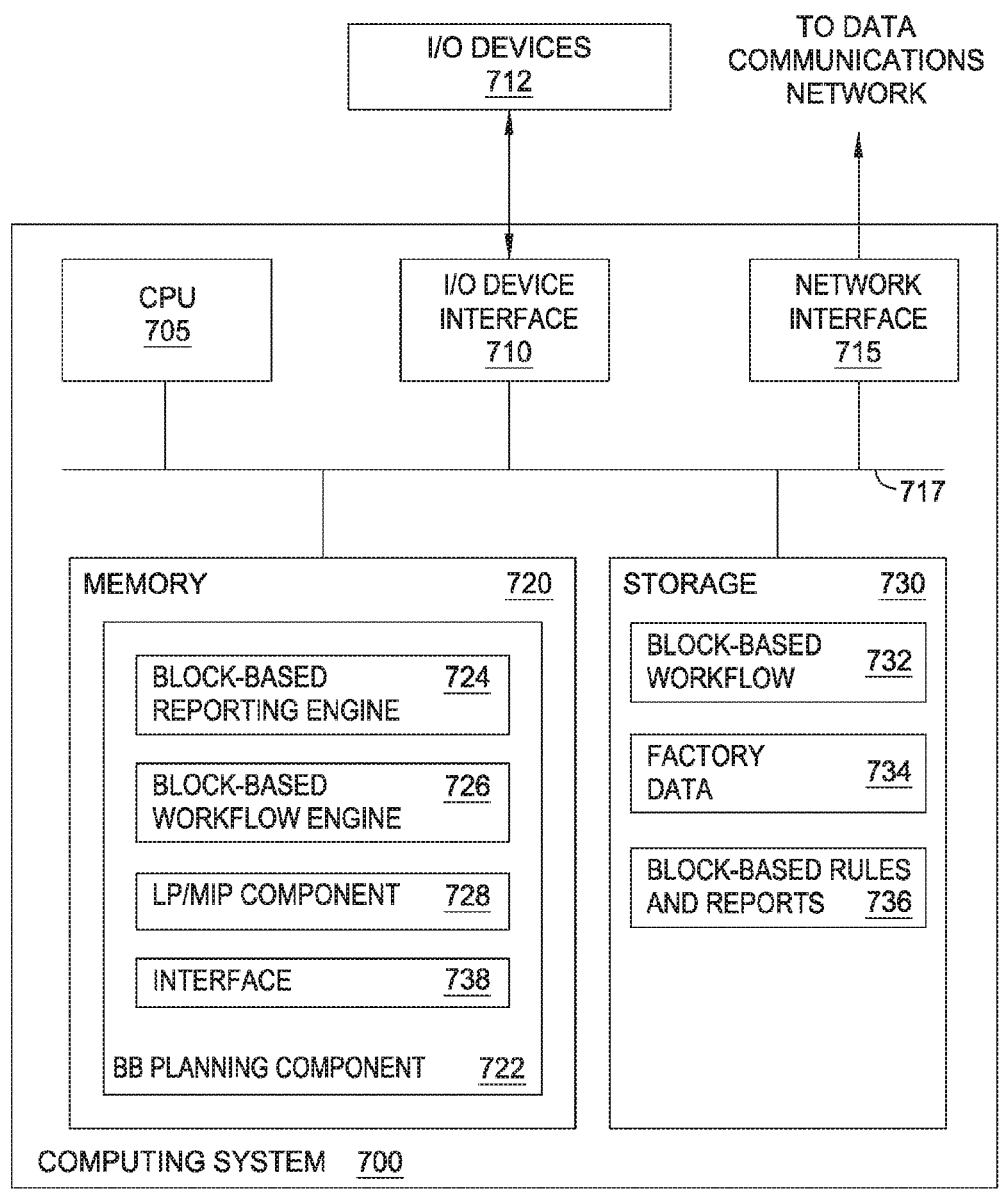
FIG. 7 illustrates a computing system configured with a block-based planning component, in accordance with embodiments of the present disclosure.

FIG. 7 illustrates a computing system 700 configured to execute a block-based workflow to perform a planning process a manufacturing environment, according to one embodiment. As shown the computing system 700 includes, without limitation, a central processing unit (CPU) 705, a network interface 715, a memory 720, and storage 730, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, the memory 720 includes a BB planning component 722, which includes BB reporting engine 724, a BB workflow engine 726, LP/MIP solver 728, and interface 738. The storage 730 includes BB workflow 732, factory data 734 and BB reports and rules 736. Further, although not show, memory 720 can also include a spreadsheet application (e.g., such as spreadsheet application 130), etc. In one embodiment, the BB workflow engine 734 executes each of the blocks in BB workflow 732. For example, as mentioned above, each block in the BB workflow 732 can encapsulate a set of operations to be performed when executing each block. Further, each set of operations can be configured with one or more BB reports and rules (e.g., stored in BB rules and reports 736). As also mentioned above, the BB workflow engine 726 can further interact with the BB reporting engine 724 and the LP/MIP solver 728 when executing the workflow blocks.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C#, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, executed in parallel, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for executing a block-based (BB) workflow to perform a planning process for a semiconductor manufacturing environment, comprising:
   receiving at least one BB workflow comprising a plurality of blocks, wherein the plurality of blocks specify a set of operations for performing the planning process for the semiconductor manufacturing environment;
   accessing a plurality of block definitions corresponding to the plurality of blocks; and
   executing the at least one BB workflow by performing the set of operations based on the plurality of block definitions, comprising:
      retrieving planning data describing an operating state of the semiconductor manufacturing environment and a set of demands for semiconductor devices to be produced from the semiconductor manufacturing environment;
      converting the planning data from a first schema currently used by the semiconductor manufacturing environment to a second schema that is compatible with the planning process to be used by the semiconductor manufacturing environment;
      generating, based on the converted data corresponding to the second schema, a plan for the semiconductor manufacturing environment, wherein the generated plan determines whether the semiconductor manufacturing environment has capacity to satisfy the set of demands, determines at least one change that should be made to the semiconductor manufacturing environment in order to satisfy the set of demands, or runs one or more experiments to determine operations to be performed within the semiconductor manufacturing environment; and
   operating one or more manufacturing tools in the semiconductor manufacturing environment to perform front end fabrication or back end fabrication of semiconductor wafers for the semiconductor devices according to the plan.

2. The method of claim 1, wherein the planning data that describes the operating state of the semiconductor manufacturing environment further describes the capacity of the semiconductor manufacturing environment to produce the semiconductor devices, a number of the one or more manufacturing tools operating in the semiconductor manufacturing environment, operating parameters of the one or more manufacturing tools, and the one or more manufacturing tools needed to produce the semiconductor devices, and wherein the planning data that describes the set of demands describes orders for the semiconductor devices and projected sales for the semiconductor devices.

3. The method of claim 1, wherein generating the plan comprises:
   creating at least one linear programming (LP) algorithm based on at least one BB sub-rule specified in one or more blocks of the at least one BB workflow; and
   using the at least one LP algorithm according to one or more criteria specified in the at least one BB sub-rule to generate the plan.

4. The method of claim 1, wherein a request to perform the planning process is received from one of a web user interface (UI), a thick client UI, or a spreadsheet application.

5. The method of claim 1, further comprising evaluating, for one or more blocks of the at least one BB workflow, at least one BB sub-rule or report to determine at least one operation of the set of operations to perform.

6. The method of claim 1, wherein executing the at least one BB workflow further comprises:
   publishing at least one of the retrieved planning data, the converted data, or the generated plan to a storage system in the semiconductor manufacturing environment; and
   upon determining an error in a generated plan, retrieving at least one of the planning data, the converted data, or the generated plan from the storage system to reproduce the error in the semiconductor manufacturing environment.

7. The method of claim 1, wherein executing the at least one BB workflow further comprises:
   evaluating the planning data in one of the first schema or second schema for errors; and
   reporting any determined errors to a user.

8. A non-transitory computer-readable medium containing computer program code that, when executed by a processor, performs an operation for executing a block-based (BB) workflow to perform a planning process for a semiconductor manufacturing environment, the operation comprising:
   receiving at least one BB workflow comprising a plurality of blocks, wherein the plurality of blocks specify a set of operations for performing the planning process for the semiconductor manufacturing environment;
   accessing a plurality of block definitions corresponding to the plurality of blocks; and
   executing the at least one BB workflow by performing the set of operations based on the plurality of block definitions, comprising:
      retrieving planning data describing an operating state of the semiconductor manufacturing environment and a set of demands for semiconductor devices to be produced from the semiconductor manufacturing environment;
      converting the planning data from a a first schema currently used by the semiconductor manufacturing environment to a second schema that is compatible with the planning process to be used by the semiconductor manufacturing environment;
      generating, based on the converted data corresponding to the second schema, a plan for the semiconductor manufacturing environment, wherein the generated plan determines whether the semiconductor manufacturing environment has capacity to satisfy the set of demands, determines at least one change that should be made to the semiconductor manufacturing environment in order to satisfy the set of demands, or runs one or more experiments to determine operations to be performed within the semiconductor manufacturing environment; and operating one or more manufacturing tools in the semiconductor manufacturing environment to perform front end fabrication or back end fabrication of semiconductor wafers for the semiconductor devices according to the plan.

9. The non-transitory computer-readable medium of claim 8, wherein the planning data that describes the operating state of the semiconductor manufacturing environment further describes the capacity of the semiconductor manufacturing environment to produce the semiconductor devices, a number of the one or more manufacturing tools operating in the semiconductor manufacturing environment, operating parameters of the one or more manufacturing tools, and the one or more manufacturing tools needed to produce the semiconductor devices, and wherein the planning data that describes the set of demands describes orders for the semiconductor devices and projected sales for the semiconductor devices.

10. The non-transitory computer-readable medium of claim 8, wherein generating the plan comprises:
creating at least one linear programming (LP) algorithm based on at least one BB sub-rule specified in one or more blocks of the at least one BB workflow; and
using the at least one LP algorithm according to one or more criteria specified in the at least one BB sub-rule to generate the plan.

11. The non-transitory computer-readable medium of claim 8, wherein a request to perform the planning process is received from one of a web user interface (UI), a thick client UI, or a spreadsheet application.

12. The non-transitory computer-readable medium of claim 8, wherein the operation further comprises evaluating, for one or more blocks of the at least one BB workflow, at least one BB sub-rule or report to determine at least one operation of the set of operations to perform.

13. The non-transitory computer-readable medium of claim 8, wherein executing the at least one BB workflow further comprises:
publishing at least one of the retrieved planning data, the converted data, or the generated plan to a storage system in the semiconductor manufacturing environment; and
upon determining an error in a generated plan, retrieving at least one of the planning data, the converted data, or the generated plan from the storage system to reproduce the error in the semiconductor manufacturing environment.

14. The non-transitory computer-readable medium of claim 8, wherein executing the at least one BB workflow further comprises:
evaluating the planning data in one of the first schema or second schema for errors; and
reporting any determined errors to a user.

15. A system, comprising:
at least one processor; and
a memory containing a program that, when executed by the at least one processor, performs an operation for executing a block-based (BB) workflow to perform a planning process for a semiconductor manufacturing environment, the operation comprising:
receiving at least one BB workflow comprising a plurality of blocks, wherein the plurality of blocks specify a set of operations for performing the planning process for the semiconductor manufacturing environment;
accessing a plurality of block definitions corresponding to the plurality of blocks; and
executing the at least one BB workflow by performing the set of operations based on the plurality of block definitions, comprising:
retrieving planning data describing an operating state of the semiconductor manufacturing environment and a set of demands for semiconductor devices to be produced from the semiconductor manufacturing environment;
converting the planning data from a a first schema currently used by the semiconductor manufacturing environment to a second schema that is compatible with the planning process to be used by the semiconductor manufacturing environment;
generating, based on the converted data corresponding to the second schema, a plan for the semiconductor manufacturing environment, wherein the generated plan determines whether the semiconductor manufacturing environment has capacity to satisfy the set of demands, determines at least one change that should be made to the semiconductor manufacturing environment in order to satisfy the set of demands, or runs one or more experiments to determine operations to be performed within the semiconductor manufacturing environment; and
operating one or more manufacturing tools in the semiconductor manufacturing environment to perform front end fabrication or back end fabrication of semiconductor wafers for the semiconductor devices according to the plan.

16. The system of claim 15, wherein the planning data that describes the operating state of the semiconductor manufacturing environment further describes the capacity of the semiconductor manufacturing environment to produce the semiconductor devices, a number of the one or more manufacturing tools operating in the semiconductor manufacturing environment, operating parameters of the one or more manufacturing tools, and the one or more manufacturing tools needed to produce the semiconductor devices, and wherein the planning data that describes the set of demands describes orders for the semiconductor devices and projected sales for the semiconductor devices.

17. The system of claim 15, wherein generating the plan comprises:
creating at least one linear programming (LP) algorithm based on at least one BB sub-rule specified in one or more blocks of the at least one BB workflow; and
using the at least one LP algorithm according to one or more criteria specified in the at least one BB sub-rule to generate the plan.

18. The system of claim 15, wherein a request to perform the planning process is received from one of a web user interface (UI), a thick client UI, or a spreadsheet application.

19. The system of claim 15, wherein the operation further comprises evaluating, for one or more blocks of the at least one BB workflow, at least one BB sub-rule or report to determine at least one operation of the set of operations to perform.

20. The system of claim 15, wherein executing the at least one BB workflow further comprises:
- publishing at least one of the retrieved planning data, the converted data, or the generated plan to a storage system in the semiconductor manufacturing environment; and
- upon determining an error in a generated plan, retrieving at least one of the planning data, the converted data, or the generated plan from the storage system to reproduce the error in the semiconductor manufacturing environment.

* * * * *